US010582807B2

(12) United States Patent
Hoare et al.

(10) Patent No.: US 10,582,807 B2
(45) Date of Patent: Mar. 10, 2020

(54) PERSONAL BLENDER (71) Applicant: BREVILLE PTY LIMITED, Alexandria, New South Wales (AU)

(72) Inventors: Richard Hoare, Lane Cove (AU); Khon Thai, Campsie (AU); Raymond George Corkin, Denham Court (AU)

(73) Assignee: BREVILLE PTY LIMITED, Alexandria, New South Wales (AU)

(*) Notice: Subject to any disclaimer, the term of this patent is extended or adjusted under 35 U.S.C. 154(b) by 486 days.

(21) Appl. No.: 15/326,495

(22) PCT Filed: Jul. 16, 2015

(86) PCT No.: PCT/AU2015/000419
§ 371 (c)(1),
(2) Date: Jan. 16, 2017

(87) PCT Pub. No.: WO2016/007997
PCT Pub. Date: Jan. 21, 2016

(65) Prior Publication Data
US 2017/0196405 A1 Jul. 13, 2017

(30) Foreign Application Priority Data

Jul. 17, 2014 (AU) .................................. 2014902763

(51) Int. Cl.
*A47J 43/046* (2006.01)
*A47J 43/07* (2006.01)
(Continued)

(52) U.S. Cl.
CPC ........... *A47J 43/046* (2013.01); *A47J 43/042* (2013.01); *A47J 43/0716* (2013.01); *A47J 43/0727* (2013.01); *A47J 43/085* (2013.01)

(58) Field of Classification Search
CPC .... A47J 43/046; A47J 43/042; A47J 43/0716; A47J 43/0722; A47J 43/0727; A47J 43/085; B02C 18/12; B65D 45/30
See application file for complete search history.

(56) References Cited

U.S. PATENT DOCUMENTS 856,295 A * 6/1907 Prindle ................. A47J 43/046
241/199.12
3,064,949 A * 11/1962 Dewenter ............. A47J 43/046
241/195
(Continued)

FOREIGN PATENT DOCUMENTS

AU 2011202631 A1 6/2011
CA 2751217 A1 5/2012
(Continued)

OTHER PUBLICATIONS

International Search Report and Written Opinion for PCT/AU2015/000419, dated Oct. 13, 2015.
(Continued)

Primary Examiner — Nicholas J. Weiss
(74) Attorney, Agent, or Firm — Marshall, Gerstein & Borun LLP (57) ABSTRACT A food blending device including: a blending hub; a blending vessel that is removablly engagable to the hub; wherein the hub has a seal adapted to engage in an interior surface of the vessel and a clamping mechanism for engaging an exterior of a rim of the vessel.

13 Claims, 9 Drawing Sheets (51) Int. Cl.
*A47J 43/042* (2006.01)
*A47J 43/08* (2006.01)

(56) References Cited

U.S. PATENT DOCUMENTS

| | | | | |
|---|---|---|---|---|
| 3,172,441 | A * | 3/1965 | Fritz | A47J 43/046 241/282.1 |
| 3,315,946 | A * | 4/1967 | Nissman | A47J 43/046 241/282.2 |
| 7,371,004 | B1 * | 5/2008 | Branson, III | A47J 43/046 366/130 |
| 7,938,574 | B2 * | 5/2011 | McGill | A47J 43/0761 366/199 |
| 9,955,820 | B2 * | 5/2018 | Law | A47J 43/0716 |
| 2008/0037360 | A1 * | 2/2008 | McGill | A47J 43/06 366/130 |
| 2011/0149677 | A1 * | 6/2011 | Davis | A47J 43/042 366/205 |
| 2012/0006921 | A1 * | 1/2012 | Maunoury | A47J 43/042 241/101.5 |
| 2017/0340170 | A1 * | 11/2017 | Brunner | A47J 43/046 |
| 2019/0000275 | A1 * | 1/2019 | Sapire | A47J 36/10 |

FOREIGN PATENT DOCUMENTS

| | | |
|---|---|---|
| CN | 1762561 A | 4/2006 |
| CN | 101184420 A | 5/2008 |
| CN | 101258964 A | 9/2008 |
| DE | 3225591 C1 | 10/1983 |
| EP | 1130990 B1 | 7/2003 |

OTHER PUBLICATIONS

International Preliminary Report on Patentability for PCT/AU20015/000419, dated Jan. 17, 2017.

Extended European Search Report for European Patent Application No. 15821974.1, dated Mar. 14, 2018.

Office Action issued in Chinese Patent Application No. 201580045970.6, dated Aug. 2, 2018.

* cited by examiner

PERSONAL BLENDER

FIELD OF THE INVENTION

The invention relates to food blending devices and in preferred embodiments, to blenders adapted to process smaller servings than conventional domestic blenders.

BACKGROUND OF THE INVENTION

Conventional kitchen blenders can process multiple litres of liquid and are powerful enough to blend thick liquids and pastes, crush ice and pulverize some solid foods. They are found in homes, bars, juice bars and restaurants.

Personal or single serving blenders are consumer products that utilise a blending glass, cup or a mug from which a blended beverage can be directly and conveniently consumed. Personal blenders are small, in accordance with only, say, one or two servings. In a personal blender, the blending cup, glass or mug thereafter "vessel" has a base at one end and a drinking rim at the other end. The drinking rim is usually threaded to engage with a blade hub. The hub engages with the vessel and contains rotating blades that act on food in the vessel. On the side of the hub opposite the blades, a coupling component is driven by cooperating coupling component located on a motorised base. After blending, the hub and vessel are removed from the base, inverted and detached from one another. The user drinks from the threaded rim. Accordingly, vessels associated with some personal blenders require accessories that thread onto the rim of the vessel to improve the drinking experience.

Any discussion of the prior art throughout the specification should in no way be considered as an admission that such prior art is widely known or forms part of the common general knowledge in the field.

SUMMARY OF THE INVENTION

It is an object of the present invention to overcome or ameliorate at least one of the disadvantages of the prior art, or to provide a useful alternative.

It is an object of the invention in a preferred form to provide a personal blender comprising a motorised base, hub and vessel. The vessel rim is smooth and lacks threads. The hub mechanically engages the vessel with a clamping action.

It is another object of the invention in a preferred form to provide a blending hub that can be used with a blending vessel that lacks a threaded opening by compressing a seal against the vessel.

According to an aspect of the technology in a preferred form, there is provided a blending hub having a seal adapted to engage in an interior surface of a blending vessel and a clamping mechanism for engaging an exterior of a rim of the vessel.

According to an aspect of the technology in a preferred form, there is provided a food blending device including: a blending hub; a blending vessel that is removablly engagable to the hub; wherein the hub has a seal adapted to engage in an interior surface of the vessel and a clamping mechanism for engaging an exterior of a rim of the vessel in a clamping configuration.

The hub may have a pair of opposing reciprocating jaws, the jaws move in unison and are driven toward or away from the vessel. The jaws may move in unison and are driven toward or away from the vessel the by a pair of threaded actuators. The actuators may be driven in unison by an interconnecting yoke. The jaws may have interior threads features that cooperate with the actuators.

The vessel may be retained against the rim seal by one or more flexible jaws. The jaws may be carried by a ring attached to the hub. Wherein, when in an unclamped position, the jaws may be bias radially outward. Wherein, when in an unclamped position, the jaws may be bias radially outward so that the effective diameter of a jaw tips on each jaw is larger than the diameter of the rim of the vessel.

The ring may fit within a reciprocating sleeve that has an upper portion having a thicker wall than a lower portion. When the sleeve is raised relative to the jaws, the upper portion of the sleeve may drive the jaws into clamping engagement with the vessel. The sleeve may be raised either manually or by installing the hub on a motorised base.

In the clamping configuration the vessel rim may be compressed against the seal. The vessel rim may be smooth and lack threads.

The hub may have mechanical features for removeably affixing the hub to a motorised base.

The hub may retain a rotating blade assembly having blending blades at one end and a driven coupling component at an opposite end. The hub may have a concave shaped surface under the blades. The concave shaped surface may be configured to minimise fluid pressure exerted on the seal. The driven coupling may be driven by a cooperating drive coupling located on a motorised base. The hub may have mechanical features for removeably affixing the hub to the motorised base.

The hub may have a driven coupling component that drives rotation of a blending blade; such that, with the vessel clamped to the hub, the blade is located within a space enclosed by the vessel, and the coupling can be externally driven.

The device may further include a mortised base that supports the hub, the motorised base having a rotatable coupling that engages a cooperating coupling in the hub that drives rotation of a blending blade.

BRIEF DESCRIPTION OF THE DRAWING FIGURES

In order that the invention be better understood, reference is now made to the following drawing figures in which.

BEST MODE AND OTHER EMBODIMENTS

The invention provides, as exemplified in the various embodiments, a personal blender, an adapter, a personal blender accessory for a conventional kitchen blender, a kitchen blender having personal blender functionality, and a vessel for a personal blender.

Figure 1:
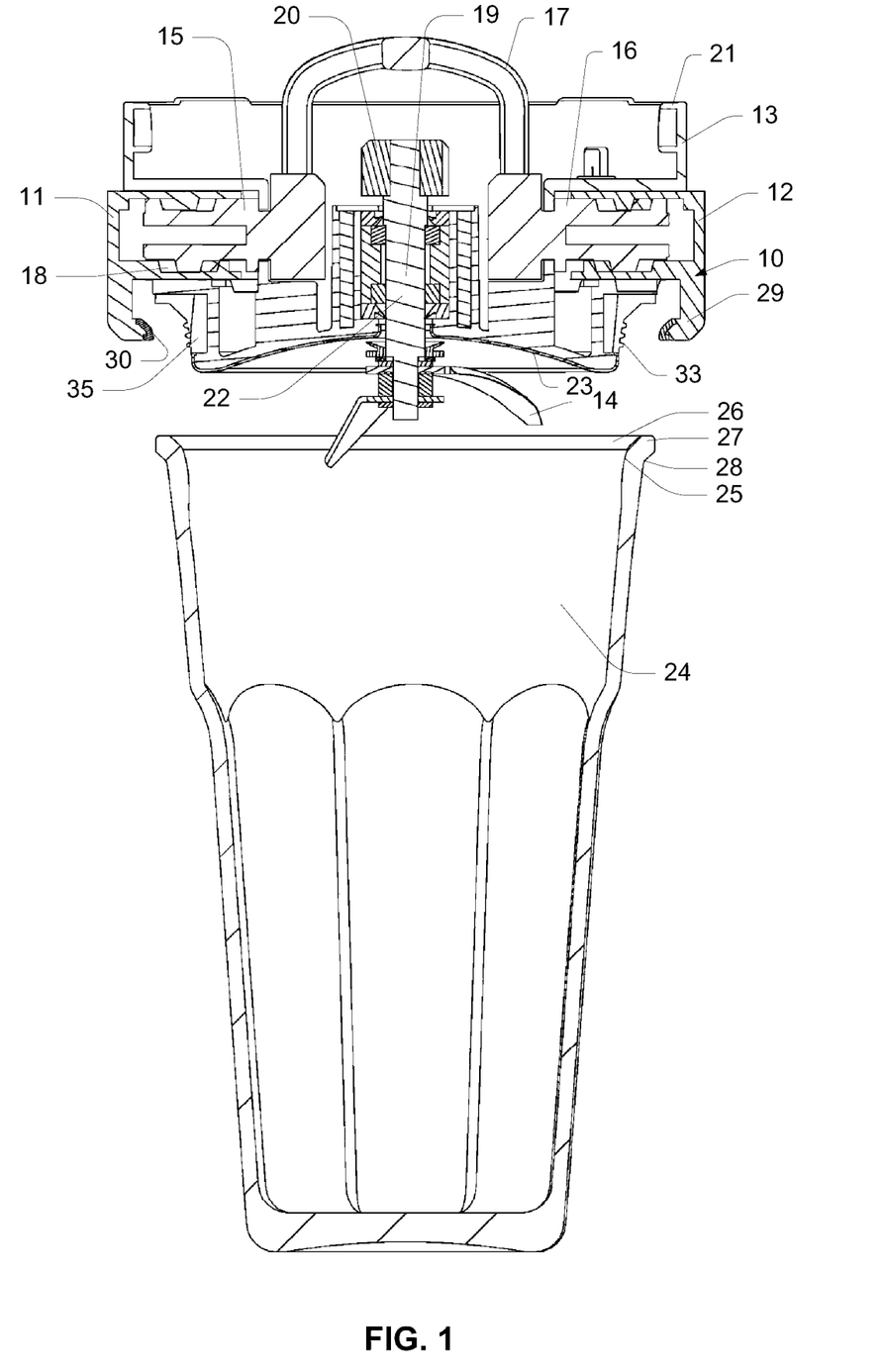
FIG. 1 is a cross sectional view of a personal blender blade hub and blending vessel.

As shown in FIG. 1, an upright vessel 24 can engage a blender hub 10 (shown in an inverted position with reference to a base). The hub has a pair of opposing reciprocating jaws 11, 12 that are retained in a chassis 13. The jaws 11, 12 move in unison and are driven toward or away from the axis of the blades 14 by a pair of threaded actuators or cams 15, 16. The actuators or cams are driven in unison by an interconnecting yoke 17. The jaws have interior threads or cam features 18 that cooperate with the actuators 15, 16. The chassis 13 retains a rotating blade assembly 19 having blending blades 14 at one end and (for example) a male coupling 20 at an opposite end. The coupling 20 is driven by a cooperating coupling located on a blending base (not shown). The chassis 13 may have mechanical features 21 for removeably affixing the hub to the blending base.

As shown in FIG. 1, the yoke 17 is in an upright position and the jaws 11, 12 are in an open orientation. When the yoke 17 is upright, it blocks mechanical access to the coupling component 20 so that it is impossible to engage the coupling component 20 with its cooperating counterpart on the blending base.

The blade shaft 22 protrudes through, for example, a concave or dished surface 23. In preferred embodiments, the curvature of the blades 14 corresponds to the curvature of the dished surface 23. A circumferential polymeric seal 35 surrounds the dished surface 23 and is adapted to make a sealing engagement with an interior surface of the upper portion of the blending vessel 24. In preferred embodiments, the vessel's sealing surface 25 is cylindrical although it may be tapered to compress or cooperate with the shape and configuration of the seal 35. The vessel 24 further includes a mouth or opening 26 that is surrounded by a smooth, continuous, protruding lip 27. The lip extends beyond an outer circumference 28 of the vessel that lies below the rim.

It should be appreciated that the invention is not limited to any particular blade size, shape or configuration nor is the precise shape of the vessel or its interior an essential feature. Similarly, it will be understood that certain blade and base configurations and vessel configurations will work better than others.

Each jaw 11, 12 is provided with an inwardly directed protrusion 29 that may carry an elastomeric vessel engaging tip 30.

Figure 2:
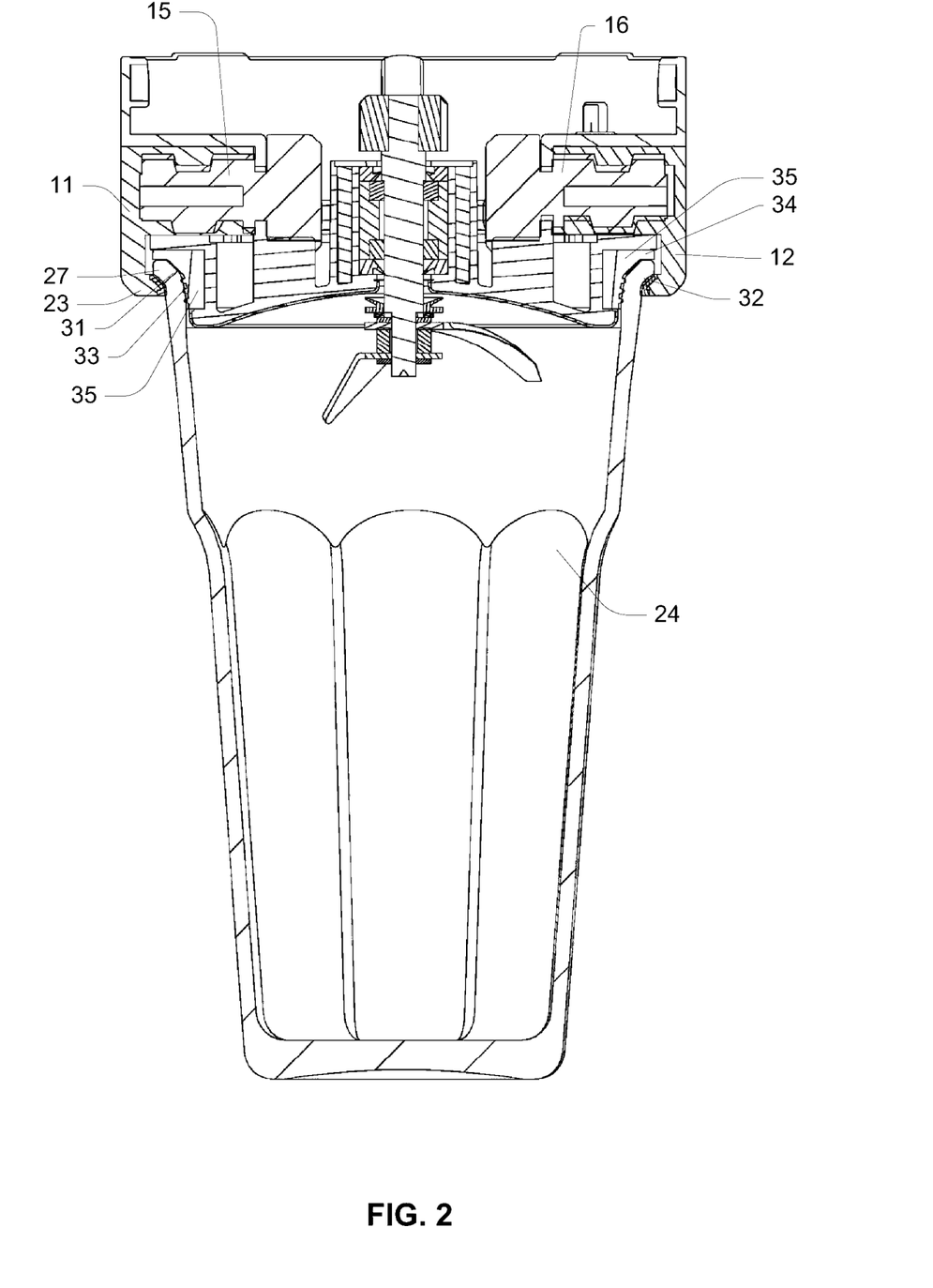
FIG. 2 is a cross section of the device depicted in FIG. 1 with the hub and vessel in engagement.

As shown in FIG. 2, when the yoke 17 is rotated into an engaged position, the jaws 11, 12 are drawn toward one another by the action of the actuators 15, 16. In this way, the protrusion 23 engages the protruding lip 27 of the vessel 24 and prevents the vessel from either rotating relative to the hub or from translating axially relative to the hub. The angled surface 31 of the jaw tip draws down a corresponding angled outer surface 32 of the vessel's rim and draws the vessel toward and into engagement with the hub's primary seal 35. As shown in FIG. 1 and FIG. 2, the seal 35 may have one or more circumferential rims 33 for engaging the interior of the vessel 24. The seal 35 may also have a circumferential landing or flange 34 for receiving the upper part of the vessel's rim and sealing against it.

Figure 3:
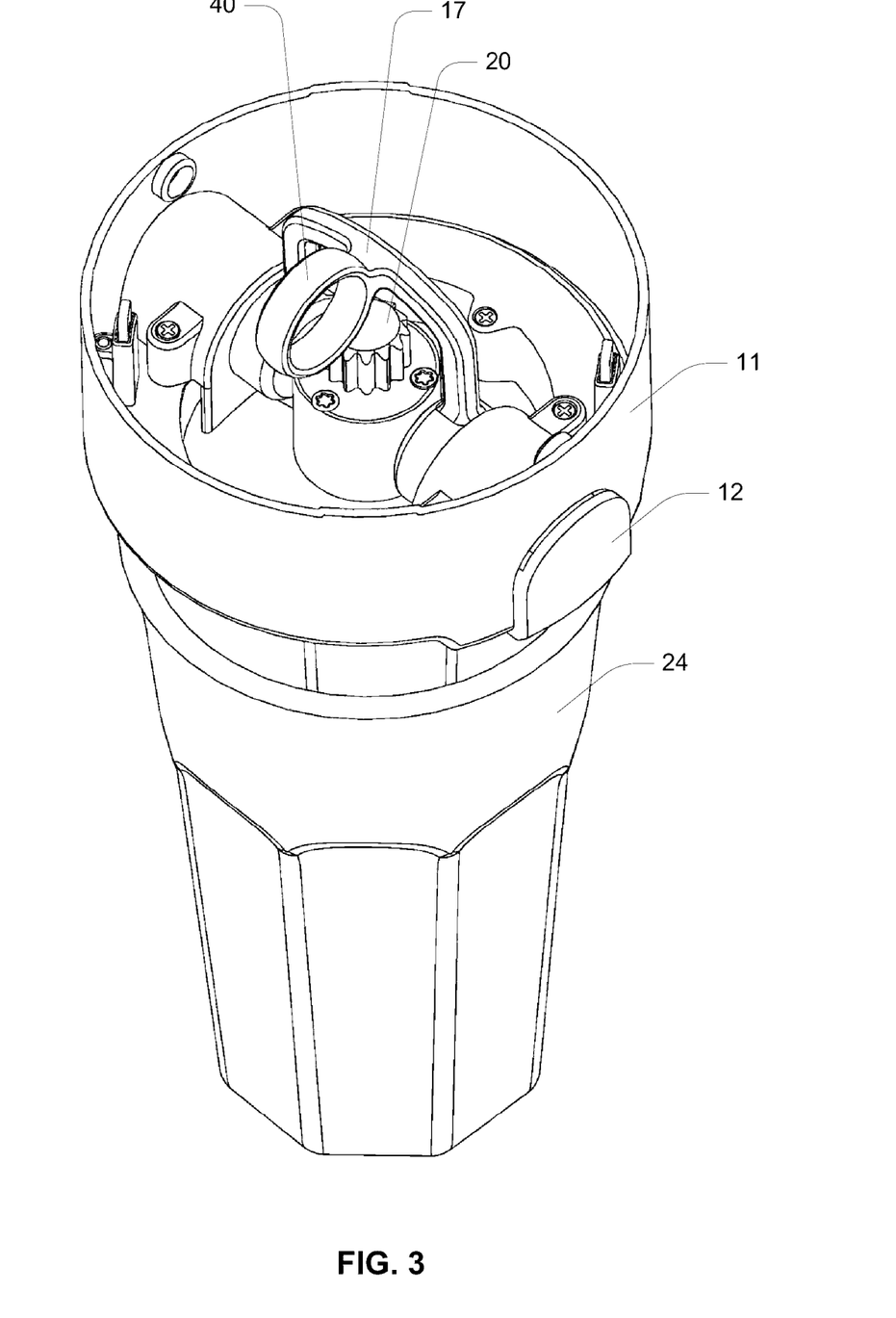
FIG. 3 is a perspective view of an inverted blender hub and vessel.

As shown in FIG. 3, the yoke 17 may be associated with a ring 40 for aiding the user in manipulating the yoke 17. The yoke in FIG. 3 is shown in an upright orientation, blocking access to the coupling component 20. In this orientation, the jaws 11, 12 are extended and there is no sealing engagement between the hub and the vessel 24. In this example, the jaws 11, 12 are shown as extending past the outer surface of the hub 11.

Figure 4:
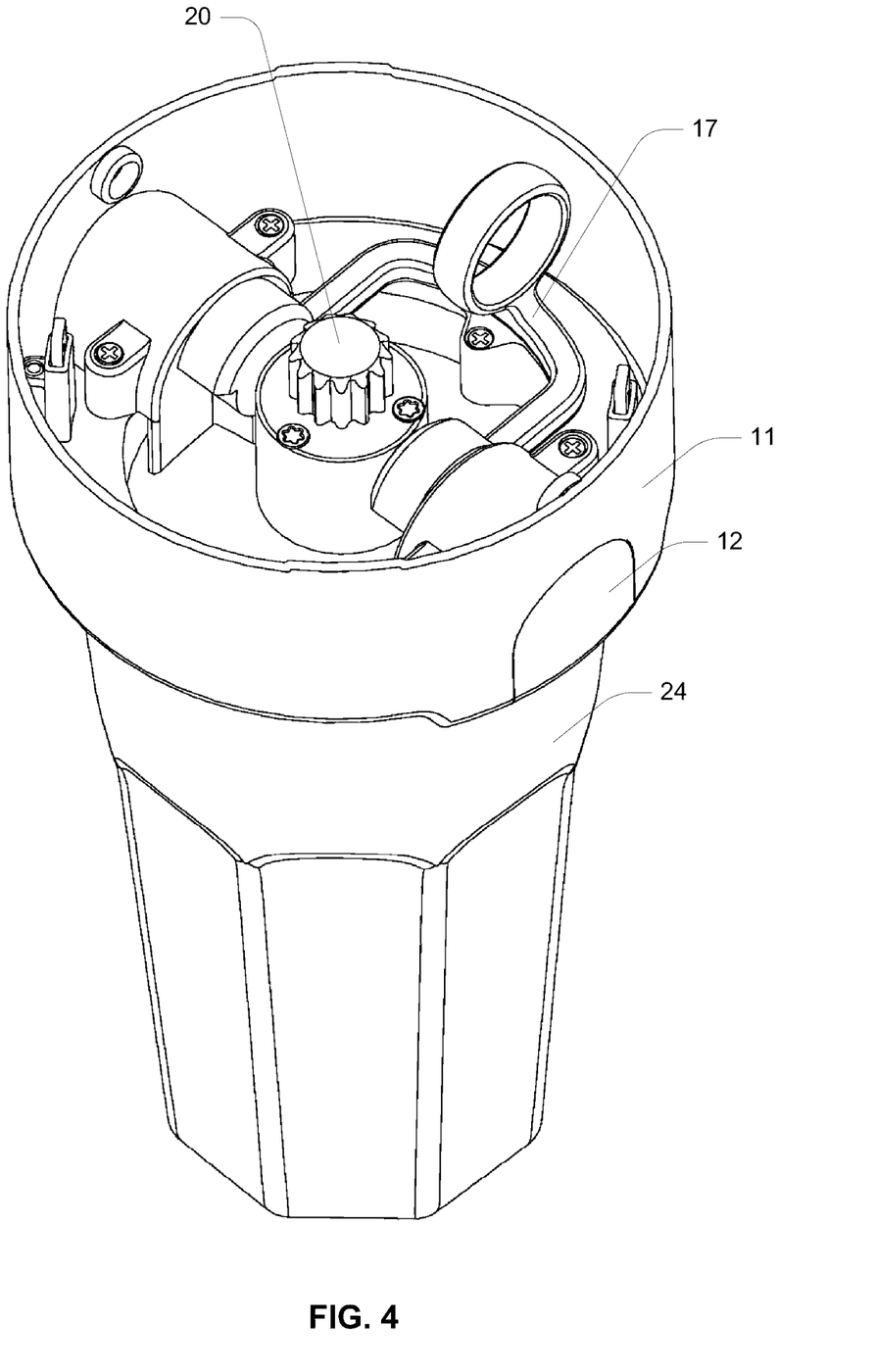
FIG. 4 is a perspective view of an inverted blender hub and vessel.

As shown in FIG. 4, the yoke 17 has been rotated away from the coupling component 20, thereby drawing the jaws 11, 12 into engagement with the vessel 24. In this example, the outer surface of the jaw 11, 12 is shown as flush with an exterior of the hub 11.

It will be appreciated that the jaws may be activated in a number of different ways. Whereas the present example has been illustrated with reference to opposing and rotating actuators, the reciprocating action of the pair of jaws 11, 12 can also be accomplished using a rotating ring-like cam or otherwise.

Figure 5:
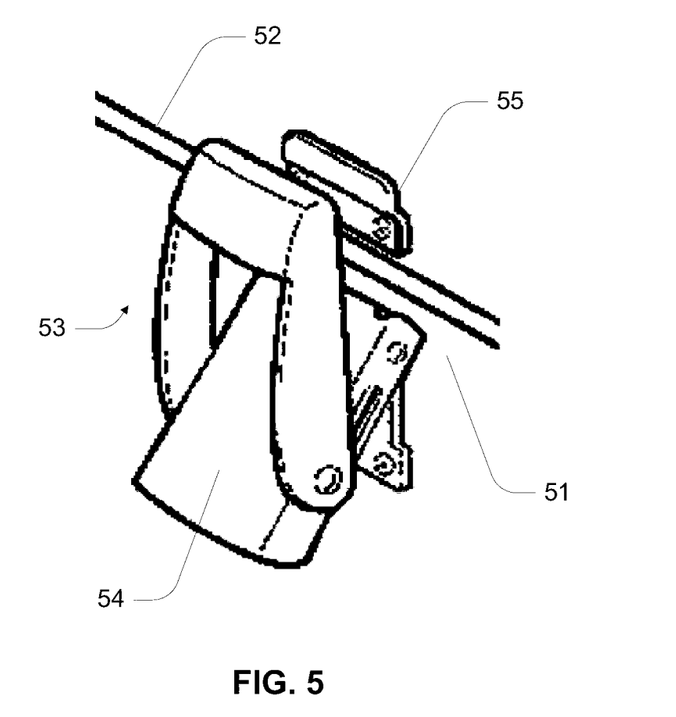
FIG. 5 is a perspective view of an over centring latch mechanism.
Figure 6:
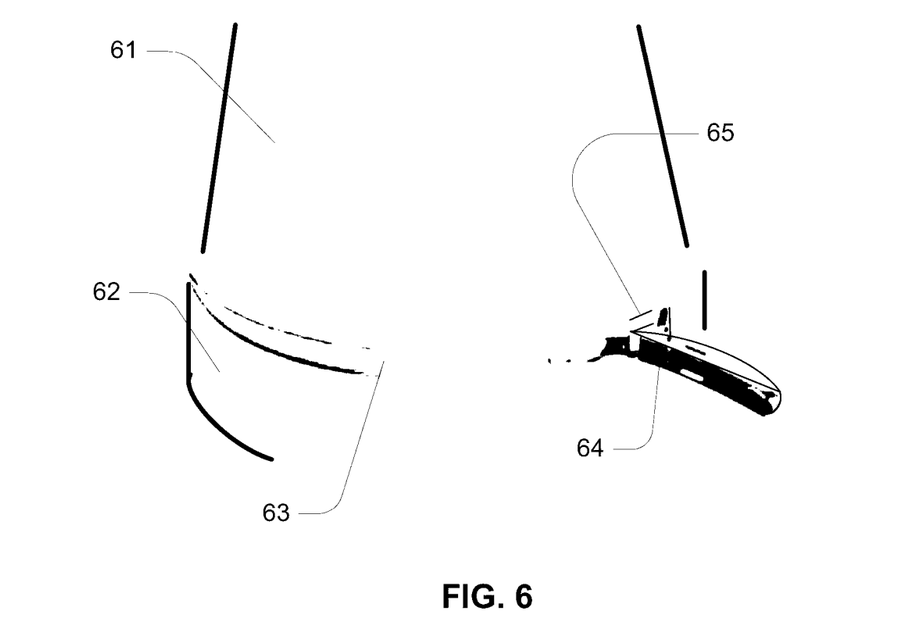
FIG. 6 is a perspective view of an over centring latch applied to a ring clamp.

As shown in FIG. 5, the hub 51 may be removably retained on to the vessel 52 using an over centring latch mechanism 53. The mechanism 53 comprises a toggle 54 and a latch 55. Either the hub or the vessel can retain the toggle so long as the other component retains the latch 55. In the alternative, the vessel 61 and hub 62 may be removably affixed to one another utilising a ring clamp 63. In this example, the ring clamp is "C" shaped in cross section and utilises an over centring latch 64. Preferably both the vessel 61 and the hub 62 are provided with protruding rims or flanges 65 that cooperate with the cross section of the clamp 63. It will be appreciated that other clamping mechanisms may be used to temporarily interconnect the vessel 61 and the hub 62.

Figure 7:
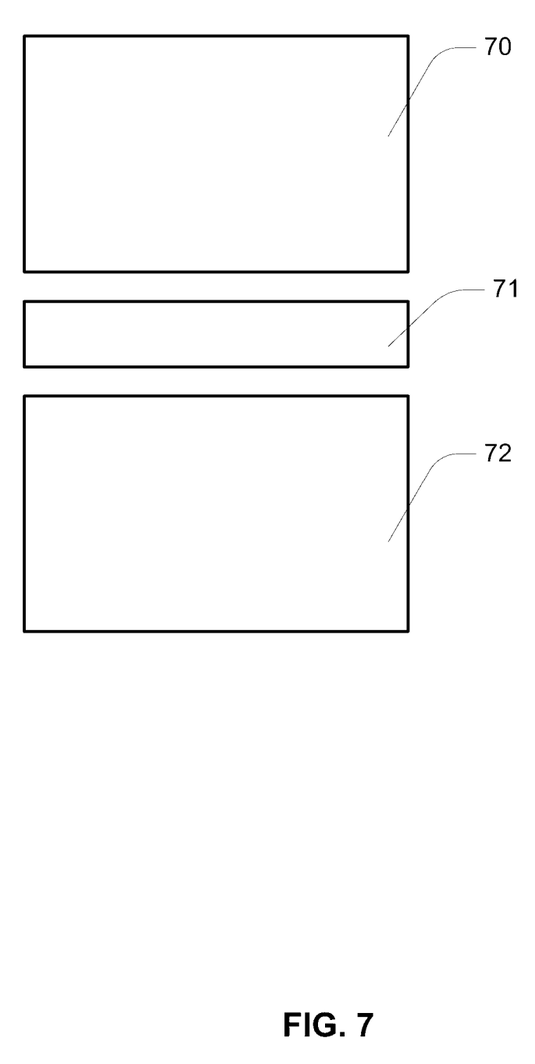
FIG. 7 is a schematic diagram of a vessel, hub and base.

As shown in FIG. 7, the invention has many commercially viable permutations, both isolating and combining vessel 70, hub 71 and motorised base 72 in various ways. A drinking vessel 70 may be inventively configured to engage a hub 71 made in accordance with the above teachings. The hub of the applicant's technology is not limited to requiring a specific type of base 72. However, the nature of the hub 71 allows for convenient interconnection with a base of a conventional kitchen blender. In this mode of operation the upright glass is filled and the hub is attached before the assembly is inverted and placed on the base 72. The hub 71 may also be used on small or personal blender bases, hand held equipment or inverted blenders, without limitation. The base may have an interface with settings, speeds or other preferences that are optimised for the hub 71 or its vessel 70.

Figure 8:
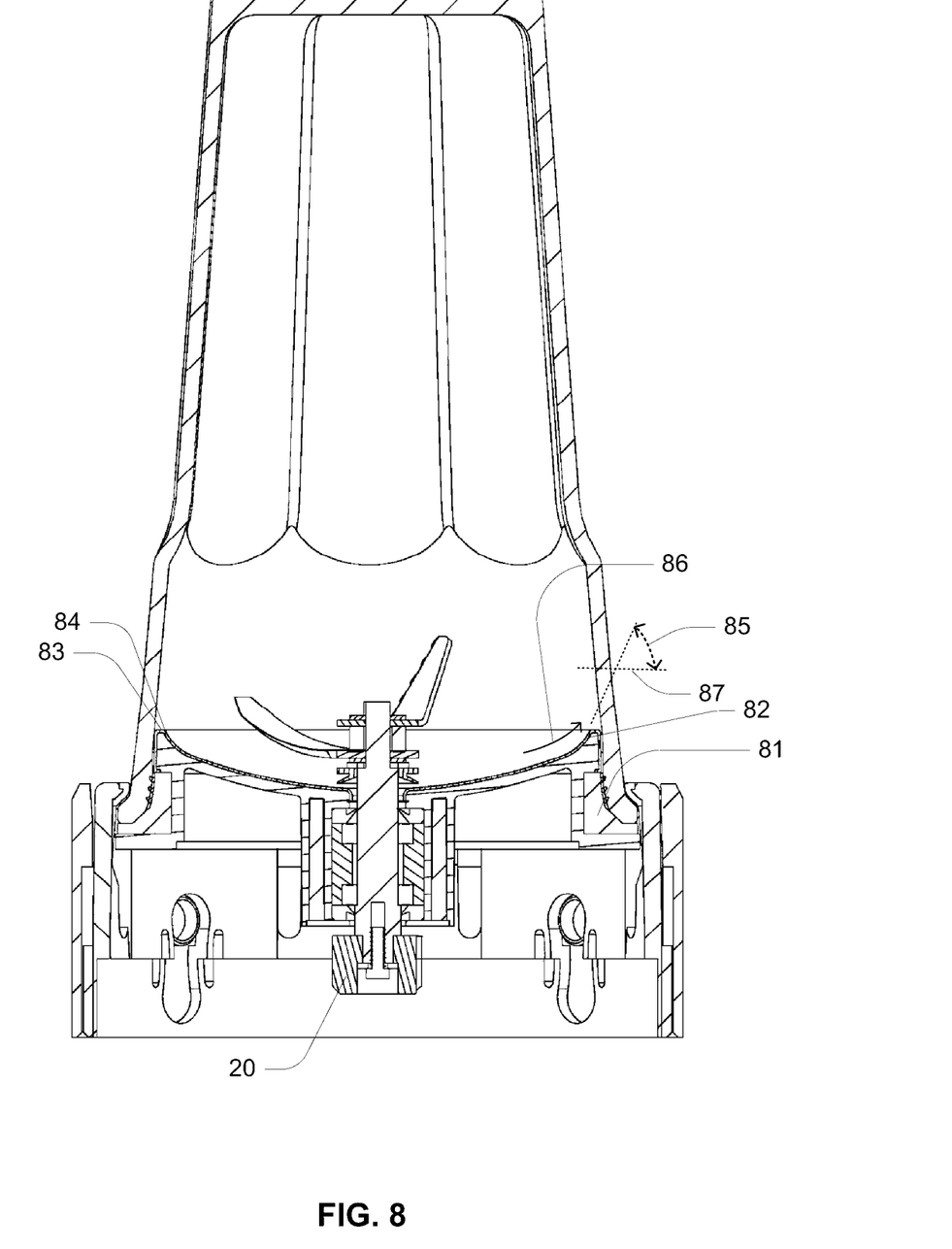
FIG. 8 is a cross sectional diagram of a personal blender blade hub and blending vessel.

As shown in FIG. 8, the concave or dish shaped floor or surface under the blades can be configured and shaped to minimise fluid pressure exerted on the seals 81. In the example of FIG. 8, it can be seen that the bowl dish shaped portion 82 forms a circular edge 83 where it meets the optional flat surface or the rim 84 that surrounds the bowl shape portion 82. The action of the blades causes fluid to be ejected off of the bowl shape portion 82 in a direction that is approximately parallel to the ramp angle formed by the bowl shape 82 at that point where it meets the flat portion or outer rim 84. The ejected flow of liquid and solid particles thus has an ejection angle 85 that is deemed to be the same as the ramp angle and the angle of the ejected flow 86. In preferred embodiments, both the angle formed by the bowl shape portion adjacent to the edge 83 and the ejection angle 86 are at least 40 degrees with respect to a reference horizontal surface 87. By directing the flow upward and away from the seals 81 with the bowl's ramp angle, the pressure on the seals 81 arising within the vessel are minimised.

Figure 9:
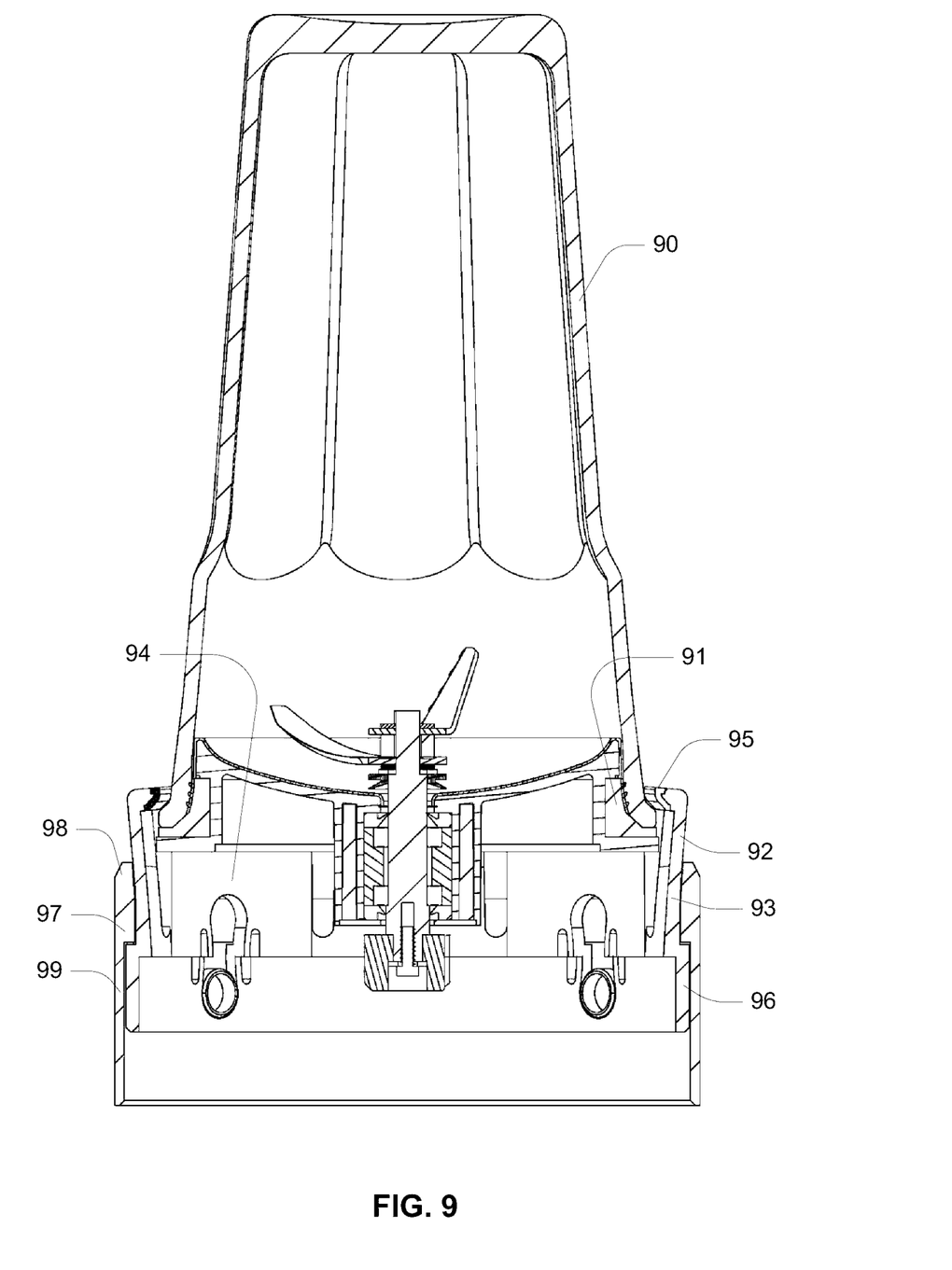
FIG. 9 is a cross sectional view of a personal blender having a locking sleeve.

As shown in FIG. 9, the vessel 90 may be retained against the rim seal 91 by one or more flexible jaws 92. The jaws 92 are carried by, for example, a ring 93. The ring 93 may be fixed or attached to the personal blender hub 94. When in the unclamped position depicted in FIG. 9, the jaws 92 are bias radially outward, preferably so that the effective diameter of the jaw tips 95 is larger than the diameter of the rim of the vessel 90. In this way, the vessel can be easily removed when the jaws are open. In this example, the ring 96 that supports the jaws 93 fits within a reciprocating sleeve 97. The sleeve 97 has an upper portion 98 having a thicker wall than the lower portion 99.

Figure 10:
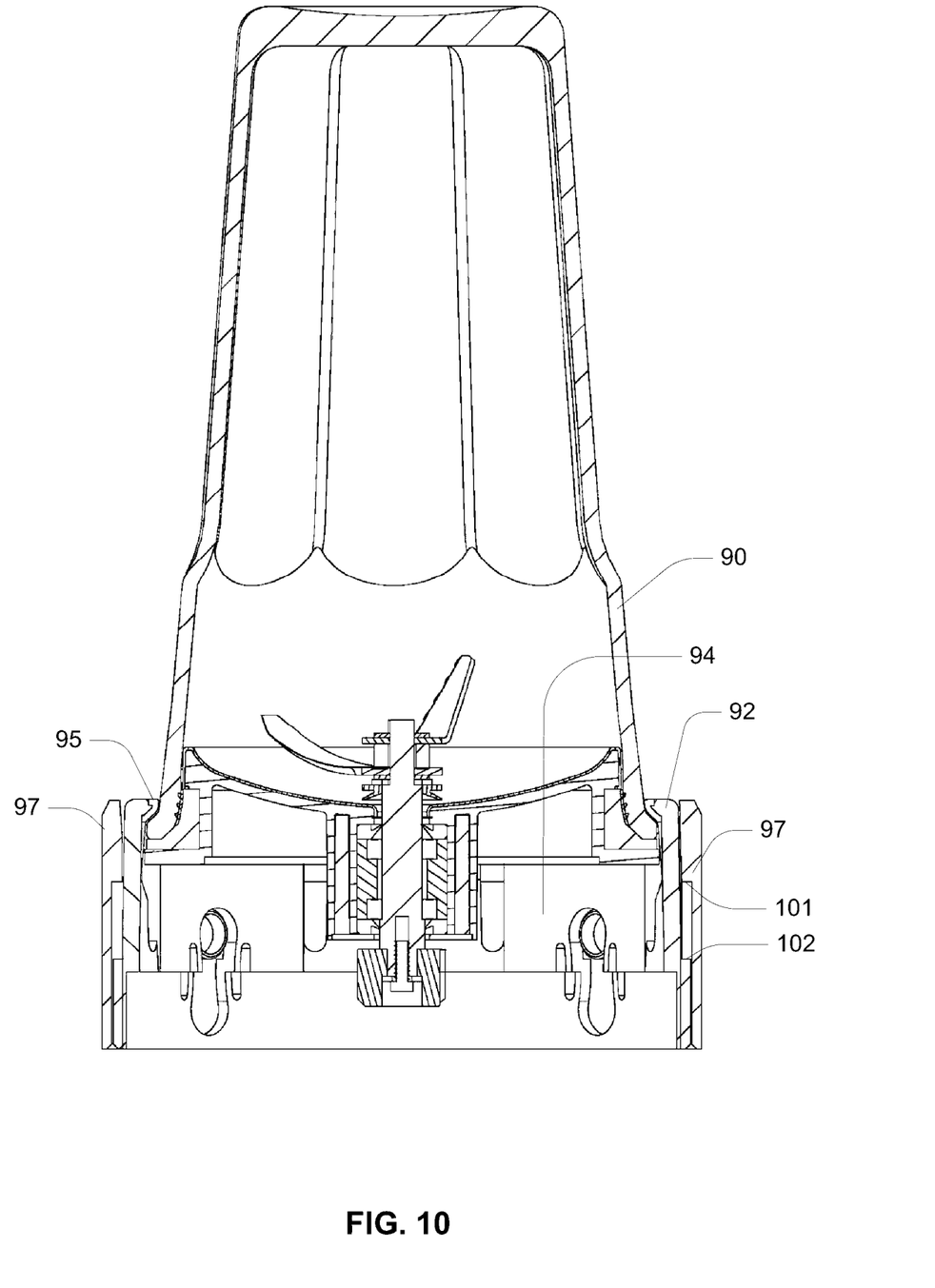
FIG. 10 is a cross sectional view of a personal blender having a locking sleeve.

As shown in FIG. 10, when the sleeve 97 is raised relative to the jaws 92 the upper portion 97 of the sleeve drives the jaws 92 into engagement with the vessel 90. This reduces the effective diameter of the jaw tips 95 so that they clamp against the vessel's rim. In the closed position of FIG. 10, the effective diameter of the jaw tips 95 is smaller than the diameter of the vessel's rim thereby preventing inadvertent withdraw of the vessel. The sleeve 97 can be raised either manually or by installing the hub 94 on to a conventional blender base. When lowering the sleeve 97 a step on an interior surface 101 interferes with a step on the ring 102 that prevents disengagement of the sleeve with the ring when unclamping the jaws.

Although the invention has been described with reference to specific examples, it will be appreciated that the invention may be embodied in many other forms.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Reference throughout this specification to "one embodiment" or "an embodiment" or "example" means that a particular feature, structure or characteristic described in connection with the embodiment is included in at least one embodiment of the present invention. Thus, appearances of the phrases "in one embodiment" or "in an example" in various places throughout this specification are not necessarily all referring to the same embodiment or example, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Any claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention.

While the present invention has been disclosed with reference to particular details of construction, these should be understood as having been provided by way of example and not as limitations to the scope of the invention.

The invention claimed is:

1. A food blending device including:
  a blending hub;
  a blending vessel that is removably engagable to the hub;
  wherein the hub has a seal adapted to engage in an interior surface of the vessel and a clamping mechanism for engaging an exterior of a rim of the vessel in a clamping configuration;
  wherein the clamping mechanism includes a pair of opposing reciprocating jaws, and wherein the jaws move in unison and are driven toward or away from the vessel by a pair of threaded actuators.

2. The device according to claim 1, wherein:
  the actuators are driven in unison by an interconnecting yoke.

3. The device according to claim 2, wherein:
  the jaws have interior thread features that cooperate with the actuators.

4. The device according to claim 1, wherein:
  in the clamping configuration, the vessel rim is compressed against the seal.

5. The device according to claim 1, wherein:
  the vessel rim is smooth and lacks threads.

6. The device according to claim 3, wherein:
  the hub has mechanical features for removeably affixing the hub to a motorized base.

7. The device according to claim 3, wherein:
  the hub retains a rotating blade assembly having blending blades at one end and a driven coupling component at an opposite end.

8. The device according to claim 1, wherein:
  the hub has a concave shaped surface under the blades.

9. The device according to claim 8, wherein:
  the concave shaped surface is configured to minimize fluid pressure exerted on the seal.

10. The device according to claim 7, wherein:
  the driven coupling component is driven by a cooperating drive coupling located on a motorized base.

11. The device according to claim 10, wherein:
  the hub has mechanical features for removably affixing the hub to the motorized base.

12. The device according to claim 1, wherein:
  the hub has a driven coupling component that drives rotation of a blending blade such that, with the vessel clamped to the hub, the blade is located within a space enclosed by the vessel, and the driven coupling component can be externally driven.

13. The device according to claim 1, wherein:
  the device further includes a motorized base that supports the hub, the motorized base having a rotatable coupling that engages a cooperating coupling in the hub that drives rotation of a blending blade.

* * * * *